(12) United States Patent
Shiwa et al.

(10) Patent No.: US 10,053,075 B2
(45) Date of Patent: Aug. 21, 2018

(54) ELECTROMAGNETIC SERVO BRAKE

(71) Applicant: Robert Bosch GmbH, Stuttgart (DE)

(72) Inventors: Masaki Shiwa, Paris (FR); Laurent Lhuillier, Le Blanc Mesnil (FR); Antony Auguste, Villiees/Marne (FR)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 14/901,065

(22) PCT Filed: Jun. 18, 2014

(86) PCT No.: PCT/EP2014/062830
§ 371 (c)(1),
(2) Date: Dec. 28, 2015

(87) PCT Pub. No.: WO2014/206830
PCT Pub. Date: Dec. 31, 2014

(65) Prior Publication Data
US 2016/0152220 A1 Jun. 2, 2016

(30) Foreign Application Priority Data

Jun. 28, 2013 (FR) ...................................... 13 56267

(51) Int. Cl.
*B60T 13/575* (2006.01)
*B60T 11/18* (2006.01)
*B60T 13/74* (2006.01)
(52) U.S. Cl.
CPC ............. *B60T 11/18* (2013.01); *B60T 13/575* (2013.01); *B60T 13/745* (2013.01)
(58) Field of Classification Search
CPC .................................................... B60T 13/575
See application file for complete search history.

(56) References Cited

U.S. PATENT DOCUMENTS 4,354,353 A * 10/1982 Laue ..................... B60T 13/575
403/220
4,566,275 A * 1/1986 Farr ...................... B60T 13/145
60/554
4,650,363 A 3/1987 Kehl et al.

FOREIGN PATENT DOCUMENTS

| CN | 102458940 A | 5/2012 |
| CN | 103129546 A | 6/2013 |
| FR | 2 860 474 A1 | 4/2005 |
| FR | 2 947 228 A1 | 12/2010 |
| JP | 62-132024 A | 6/1987 |
| JP | 7-108920 A | 4/1995 |
| JP | 2012-530645 A | 12/2012 |

OTHER PUBLICATIONS

International Search Report corresponding to PCT Application No. PCT/EP2014/062830, dated Mar. 10, 2015 (German and English language document) (5 pages).

* cited by examiner

*Primary Examiner* — F. Daniel Lopez
(74) *Attorney, Agent, or Firm* — Maginot, Moore & Beck LLP

(57) ABSTRACT

A servo brake includes a thrust unit connecting a servo-piston to a primary piston in an actuation direction. The thrust unit includes a plunger with a front end in the form of a spherical cap and pressed in a cup of the primary piston and a rear end that includes a ball joint. A bearing has a base pressed on a reaction disc and a sleeve that receives the ball joint of the plunger.

5 Claims, 2 Drawing Sheets

ELECTROMAGNETIC SERVO BRAKE

This application is a 35 U.S.C. § 371 National Stage Application of PCT/EP2014/062830, filed on Jun. 18, 2014, which claims the benefit of priority to Serial No. FR 1 356 267, filed on Jun. 28, 2013 in France, the disclosures of which are incorporated herein by reference in their entirety.

BACKGROUND

The present disclosure relates to an electromagnetic servo brake comprising a master cylinder primary piston thrust in the direction of actuation thereof by a thrust rod, which is in turn pressed against the servo piston.

In electromagnetic servo brakes, the primary piston is thrust by a thrust rod identical to that of the vacuum servo brake, in which the thrust rod is formed by a rod so to speak connected to a base in the form of a piston pressing by way of the reaction disk against the servo piston actuated by the pneumatically operating braking force amplifier or by the electric motor driving this piston by way of a rack transmission.

In the case of the servo piston connected to the pneumatic piston, the assembly is mounted so as to float in a relative manner and has sufficient freedom so as not to impose a component of transverse force on the primary piston, but solely a longitudinal force.

In the case of the electromagnetic servo brake, the servo piston is held rigidly by the connection thereof by rack to the electromagnetic drive, such that it is not adapted and the thrust exerted onto the primary piston has a relatively significant transverse component.

Document FR 03 11 580 describes an electrical brake assist servomotor shown in FIG. 1 of said document, which has been included as FIG. 1 of this patent.

FIG. 1 shows the servo brake, in section, combined with the tandem master cylinder 48, of which the primary piston 49 is thrust by the servo piston 20 by way of a thrust rod 47 or push rod. This push rod is pressed against the servo piston by way of a reaction disk 40. The thrust rod 47 is formed of two parts so as to make it possible to adapt the length of said thrust rod to the specific type of servo brake; the thrust rod has a rounded front end and a rear end in the form of a disk pressed against the reaction disk. The thrust rod 47 is thus blocked in the direction of the axis (xx) of the servo brake, with no degree of freedom, such that the transverse component of the thrust exerted by the servo piston 20 onto the thrust rod 47 is translated by a transverse component of force exerted onto the primary piston 49, which causes uneven wear thereof.

The references used in the description of the present FIG. 1 are those from document FR 03 11 580. The references not described and shown in FIG. 1 relate to the elements of this known servo brake not described here since they are not directly involved in the presentation of the present disclosure.

By way of comparison, tests have shown that under the same operating conditions, the transverse component exerted by the thrust rod of a pneumatic servo brake onto the primary piston was negligible, whereas in the case of an electromagnetic servo brake this component was significant.

SUMMARY

The object of the disclosure is to develop a thrust rod or push rod for an electromagnetic servo brake exerting practically no thrust with a transverse component onto the primary piston.

To this end, the disclosure relates to an electromagnetic servo brake of the type defined above, characterized in that it comprises a thrust unit connecting the servo piston to the primary piston in the direction of actuation thereof and formed of a push rod, of which the front end in the form of a spherical cap is pressed into a cup of the primary piston, the rear end comprising a ball, and formed of a bearing having a base pressed against the reaction disk and a sleeve receiving the ball of the push rod.

The servo brake according to the disclosure has the advantage of creating a degree of freedom for the thrust unit replacing the traditional thrust rod. This degree of freedom in the transverse direction prevents the transmission of a transverse component of the force exerted by the servo piston onto the thrust unit, which, without this degree of freedom, would transmit this force with its transverse component to the primary piston.

The thrust unit advantageously comprises a clamp in tulip form, of which the petals have fastening ends protruding outwardly and forming internally a neck resiliently delimiting the receiving cavity of the ball of the push rod. The sleeve of the bearing comprises an inner throat for serving as a support at the end of the petals of the clamp, and the clamp is placed in position on the ball of the thrust rod before this assembly is engaged and connected in the sleeve by the fastening of the end of the petals in the throat of the sleeve. This embodiment makes it possible to assemble the thrust unit in an effective manner, i.e. to combine the push rod with the bearing and to thus form an assembly securely hinged at the ball, but not disconnectable.

In accordance with a further feature, the push rod has an outer crown slightly distanced from the edge of the sleeve when the push rod is connected to the sleeve in order to limit the tilting thereof relative to the axis, before it is placed in position in the primary piston. This outer crown prevents excessive tilting of the push rod relative to the bearing, thus facilitating the placement in position of the thrust unit in the primary piston at the moment of assembly of the servo brake on the master cylinder.

In accordance with a further advantageous feature, the push rod is in two parts formed separately and assembled on the basis of the length that the push rod is to have depending on the type of servo brake.

In accordance with a further advantageous feature, the sleeve constitutes the cavity forming the cup for the ball of the push rod, the sleeve having a crimping zone in front of the cavity in order to hold the ball whilst allowing it to rotate freely.

Thus, on the whole, the disclosure makes it possible by simple means to prevent the transmission of a transverse component of the thrust force exerted onto the primary piston without the need for any structural modification of the master cylinder or assembly thereof on the electromagnetic servo brake.

BRIEF DESCRIPTION OF THE DRAWINGS

The present disclosure will be described hereinafter in greater detail with the aid of embodiments of an electromagnetic servo brake shown in the accompanying drawings, in which.

DETAILED DESCRIPTION

Figure 1:
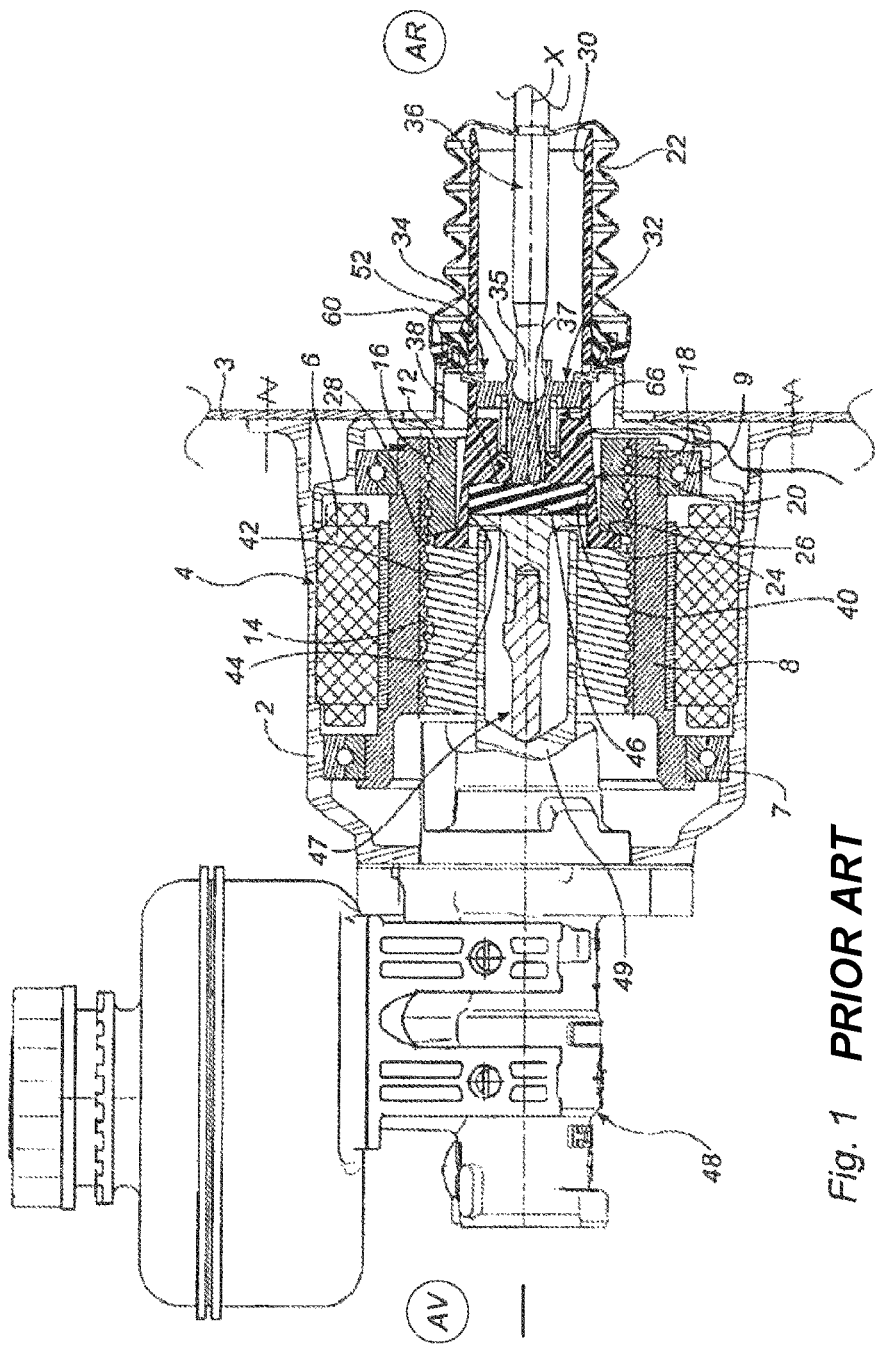
FIG. 1 is a partial sectional view of an electromagnetic servo brake according to the prior art (FR 03 11 580)

In order to simplify the description, by convention, the front (AV) of the servo brake is located on the side of the tandem master cylinder and the rear (AR) is located on the side of the control rod actuated by the brake pedal as indicated in FIG. 1.

Figure 2:
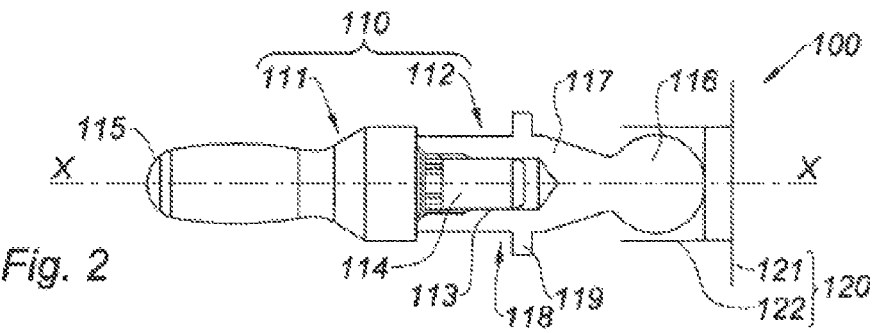
FIG. 2 is a partially sectional view of a thrust unit of an electromagnetic servo brake according to the disclosure.

FIG. 2 shows, very schematically, a thrust unit 100 for an electromagnetic servo brake according to the disclosure for transmitting the thrust of the servo piston to the primary piston. This thrust unit 100 is formed of a push rod 110 and a bearing 120 receiving an end of the push rod and pressing against the servo piston, whereas the other end of the push rod presses into a cup of the primary piston. The push rod 110 is formed in two parts—a front part 111 and a rear part 112 assembled by press fitting. The front part 111 is shown not in section, and the rear part 112 is shown in section.

The rear part 112 has a cylindrical receptacle 113 for forcibly press-fitting the pin 114 of the front part 111 and forming a one-piece assembly. These two parts 111, 112 are formed separately, and at least one of the parts has a length selected on the basis of the length that the push rod 110 is to have depending on the type of servo brake to be equipped.

Figure 3:
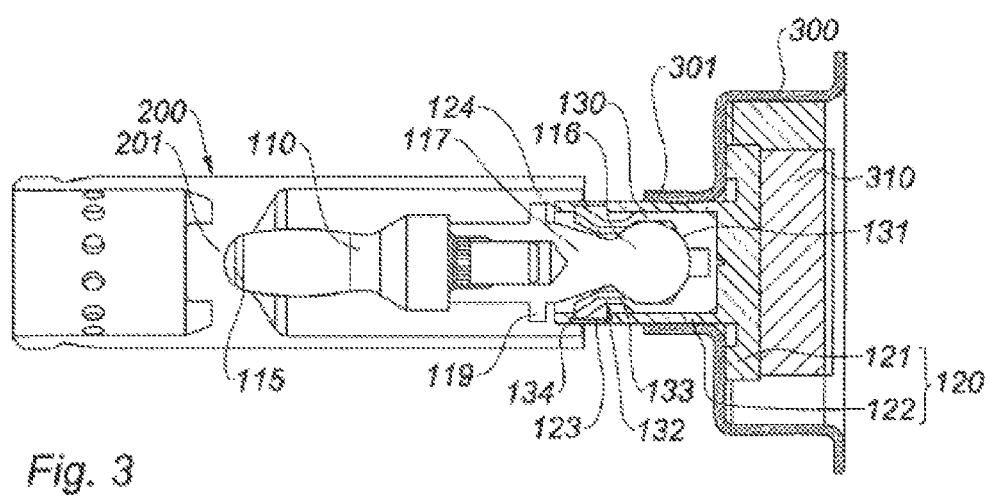
FIG. 3 is a sectional view of the combination of the servo brake thrust unit with a primary piston and with the support of the servo piston according to the disclosure.
Figure 4:
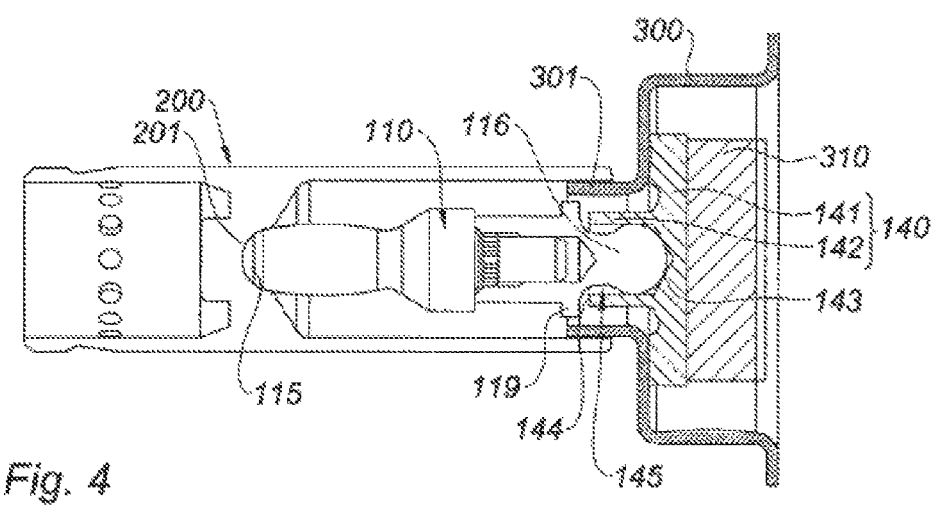
FIG. 4 is a sectional view similar to that of FIG. 3 of a variant of the thrust unit installed in the primary piston and in the servo piston support.

The push rod 110 has a front end 115, which is rounded in the form of a spherical cap in order to cooperate with a receptacle 201 in the form of a ball cup formed in the body of the primary piston 200 (FIGS. 3 and 4).

The rear end of the push rod 110 is formed by a ball 116 connected by a part 117 shaped in the form of a truncated cone to the body 118 of the push rod. Beyond this part 117 shaped in the form of a truncated cone, the body 118 carries a peripheral crown 119 serving as a stop for limiting tilting, as will be seen hereinafter.

The bearing 120 receiving the ball 116 at the rear end of the push rod 100 is formed of a base 121 formed by a disk carrying a sleeve 122 directly receiving the ball 116 of the push rod (FIG. 4) or by the interpositioning of a piece 130 (FIG. 3) forming a ball-joint connection in all cases.

The thrust unit 100 is fixed in translation in the direction of the axis (xx), but has a degree of freedom in the transverse direction thanks to the head 115 shaped as a cap freely pivoting with respect to the cup 201 of the body of the primary piston 200 and thanks to the ball 116 of the push rod 110 pivoting with respect to the bearing 120, which is in turn carried by the support of the servo piston 300.

FIG. 3 shows a first embodiment of the thrust unit 100 with a push rod 110 similar to FIG. 2 and a bearing 120 carried by the support of the servo piston 300. The bearing 120 is formed of a base 121 in the form of a disk carrying a sleeve 122, the assembly being engaged with an axial sleeve 301 of the support 300. This base 121, which presses against the reaction disk 310, receives the ball 116 of the push rod 120 by way of a clamp 130 in tulip form, forming the ball cup 131 surrounded by the petals 132 of said tulip. The petals 132 have a layout which, starting from the rear of the clamp, narrows to form a neck 133 coming in front of the ball 116 in order to retain this in the cup 131, then widens to form fastening ends 134 of the clamp 130 in the sleeve 122 of the bearing 120. To this end, the sleeve 122 comprises a peripheral throat 123 in which the protruding ends 134 of the petals 132 of the clamp 130 are fastened.

The push rod 110 and the bearing 120 are assembled by the prior mounting of the clamp 130 on the ball 116 followed by the engagement of the clamp 130 thus covering the ball 116 in the sleeve 122. During this engagement, the resilient petals 132 of the clamp 130 retract against the joint 117, shaped in the form of a truncated cone, connecting the ball 116 to the body 118 of the push rod; then, once arrived in the throat 123, the petals 132 move apart from one another resiliently and lock the clamp 130 and the ball 116 to the bearing 120 in the direction of the axis xx whilst allowing the ball 116 the possibility to pivot freely in the cup 131 formed by the clamp 130.

FIG. 3 also shows that the crown 119 of the push rod 110 is at a certain distance from the front edge 124 of the sleeve 122, which allows a transverse tilting movement of the push rod 110 relative to the sleeve 122. This movement is limited by the fact that the crown 119 comes into contact with the edge 124 of the sleeve 122. This limitation does not at all impair the normal functioning of the servo brake, but, prior to the mounting, it prevents the push rod form tilting excessively relative to the axis (xx) defined by the sleeve 122. This facilitates the placement in position of the push rod 110 in the primary piston 200, which itself is already engaged with the master cylinder. The other elements of the servo brake of the disclosure are not shown in FIG. 3.

FIG. 4 shows another variant of the electromagnetic servo brake according to the disclosure. This variant differs from the first embodiment of FIG. 3 by the form of the bearing 140, of which the base 141 carries a sleeve 142, which directly receives the ball 116 at the rear end of the push rod 110, the base of the sleeve forming the cup 143 for the ball 116. In this case also, the push rod 110 has a peripheral collar 119 intended to limit the tilting movement of the push rod 110 relative to the axis xx of the bearing 140 by pressing against the edge 144 of the sleeve 142. The ball 116 is held in the cavity closing the cup 143 by the crimping zone 145 of the sleeve 142 in front of the ball 116.

This embodiment of the push rod 110 is shorter due to the reduction of the length of the part 117 shaped in the form of a truncated cone due to the elimination of the clamp 130. The other parts of this servo brake and in particular the primary piston 200 and the servo piston or support thereof 300 are identical to the previous embodiment.

The invention claimed is:

1. An electromagnetic servo brake, comprising:
    a servo piston;
    a master cylinder primary piston; and
    a thrust unit connecting the servo piston to the primary piston in a direction of actuation, the thrust unit being pressed against the servo piston and configured to thrust the primary piston in the direction of actuation, the thrust unit including:
        a push rod having a front end configured in the form of a spherical cap and pressed into a cup of the primary piston and a rear end configured as a ball having a shape that is more than half of a sphere; and
        a bearing having a base pressed against a reaction disk and a sleeve receiving the ball of the push rod.

2. The electromagnetic servo brake as claimed in claim 1, wherein the push rod comprises two, separately-formed parts that are assembled on the basis of a length that the push rod is to have depending on the type of servo brake.

3. An electromagnetic servo brake, comprising:
    a servo piston;
    a master cylinder primary piston; and a thrust unit connecting the servo piston to the primary piston in a direction of actuation, the thrust unit being pressed against the servo piston and configured to thrust the primary piston in the direction of actuation, the thrust unit including:
  a push rod having a front end configured in the form of a spherical cap and pressed into a cup of the primary piston and a rear end configured as a ball; and
  a bearing having a base pressed against a reaction disk and a sleeve receiving the ball of the push rod,
wherein:
  the thrust unit further comprises a clamp in tulip form having petals with fastening ends protruding outwardly and forming internally a neck resiliently delimiting the receiving cavity of the ball of the push rod,
  the sleeve of the bearing comprises an inner throat configured to support the fastening ends of the petals of the clamp, and
  the clamp is placed in position on the ball of the push rod before an assembly of the clamp and the ball is engaged and connected in the sleeve by the fastening of the fastening ends of the petals in the inner throat of the sleeve.

4. An electromagnetic servo brake, comprising:
a servo piston;
a master cylinder primary piston; and
a thrust unit connecting the servo piston to the primary piston in a direction of actuation, the thrust unit being pressed against the servo piston and configured to thrust the primary piston in the direction of actuation, the thrust unit including:
  a push rod having a front end configured in the form of a spherical cap and pressed into a cup of the primary piston and a rear end configured as a ball; and
  a bearing having a base pressed against a reaction disk and a sleeve receiving the ball of the push rod,
wherein the push rod has an outer crown slightly distanced from an edge of the sleeve when the push rod is connected to the sleeve in order to limit the tilting thereof relative to the axis before it is placed in position in the primary piston.

5. An electromagnetic servo brake, comprising:
a servo piston;
a master cylinder primary piston; and
a thrust unit connecting the servo piston to the primary piston in a direction of actuation, the thrust unit being pressed against the servo piston and configured to thrust the primary piston in the direction of actuation, the thrust unit including:
  a push rod having a front end configured in the form of a spherical cap and pressed into a cup of the primary piston and a rear end configured as a ball; and
  a bearing having a base pressed against a reaction disk and a sleeve receiving the ball of the push rod,
wherein the sleeve defines the cavity forming the cup for the ball of the push rod, the sleeve having a crimping zone in front of the cavity in order to hold the ball whilst allowing the ball to rotate freely.

* * * * *